C. T. MILLER.
WATER FAUCET.
APPLICATION FILED FEB. 21, 1916.
1,226,106.
Patented May 15, 1917.
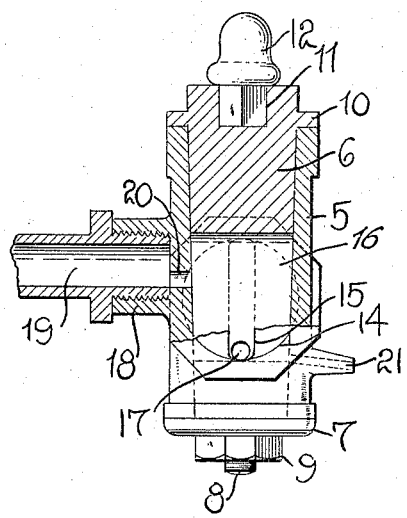
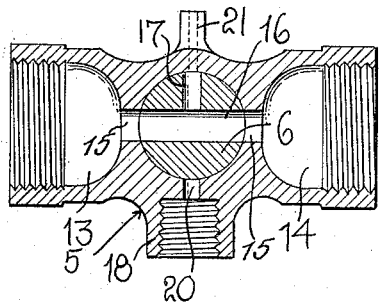 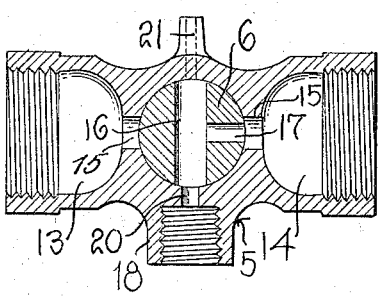
Inventor
C. T. Miller
By Watson E. Coleman
Attorney

UNITED STATES PATENT OFFICE.

CHARLES THOMAS MILLER, OF MACON, GEORGIA.

WATER-FAUCET.

1,226,106.  Specification of Letters Patent.  Patented May 15, 1917.

Application filed February 21, 1916. Serial No. 79,718.

*To all whom it may concern:*

Be it known that I, CHARLES T. MILLER, a citizen of the United States, residing at Macon, in the county of Bibb and State of Georgia, have invented certain new and useful Improvements in Water-Faucets, of which the following is a specification, reference being had to the accompanying drawings.

This invention relates to new and useful improvements in water faucets and has for its primary object to provide a combined valve and drain cock whereby, after the flow of water is cut off, the water remaining in the supply pipes may be drained therefrom.

It is another object of the invention to provide an improved combination cut-off and drain cock having service pipe connections and a hot water waste pipe connection, and means thoroughly draining the water retained in the service and waste pipes through the valve casing and discharging the same when the rotary valve member is closed.

It is a further general object of the invention to provide a device for the above purpose, which is exceedingly simple in its construction as well as highly efficient and serviceable in practical use.

With the above and other objects in view, my invention consists in the novel features of construction, combination and arrangement of parts to be hereinafter more fully described, claimed and illustrated in the accompanying drawing, in which, Figure 1 is a vertical sectional view of a combination cut-off valve and drain cock constructed in accordance with the preferred embodiment of my invention;

Fig. 2 is a horizontal section taken on the line 2—2 of Fig. 1, showing the valve closed, Fig. 3 is a similar view with the valve member or plug in its open position.

Referring in detail to the drawing, 5 designates a two-way valve casing within which the longitudinally tapering valve member or plug 6 is rotatably mounted, said plug fitting snugly in the tapering bore of the casing. The lower end of the plug is provided with a threaded stud 8 upon which a nut 9 is threaded, said nut having a flange 7 for engagement with a boss extension formed upon the valve casing. The other end of the plug 6 is also provided with an annular flange 10 to prevent shifting movement of the plug in one direction in the valve casing. This latter end of the plug is formed with a rectangular socket 11 to receive a suitable handle 12, whereby the valve plug may be conveniently turned or rotated.

Upon one side of the casing 5, a nipple 13 is formed, to which the supply or service pipe is adapted to be connected, and a nipple 14 is also formed upon the opposite side of the valve casing for connection of the cold water supply pipe thereto which extends into the house. The bore of the valve casing at diametrically opposite points is longitudinally slotted, as shown at 15, said slots communicating with the respective nipples 13 and 14. The rotary valve plug 7 is also provided with a longitudinally extending slot or port 16 which is adapted to register with the slots 15 when the valve plug is in its open position. A transversely disposed orifice 17 is also formed in the valve plug at the lower end of the port 16 and communicates with said port.

A nipple 18 projects from the valve casing at right angles to the nipples 13 and 14 and, to the same, the hot water waste pipe 19 connected to the house pipes, is suitably coupled. The wall of the casing at the inner end of this nipple and adjacent to the bottom portion thereof is provided with an opening or orifice 20.

From reference to Fig. 2 of the drawing, it will be seen that when the valve plug is in its closed position to cut off the water supply, the orifice 17 leading to the port in the plug 16 is disposed in registering relation with the slot 15 in the wall of the casing which communicates with the nipple 14. It will also be observed that this port is disposed immediately contiguous to the lower side of the wall of the nipple. Thus, all of the water remaining in the supply pipe will be drained therefrom to the port 16 on the valve plug. The valve casing is provided with a downwardly inclined drain port, indicated at 21, through which the water is discharged.

The port 16 of the valve plug, when said plug is moved to its closed position, is also in registering relation with the opening or orifice 20 in the wall of the valve casing so that the water will drain from the hot water waste pipe through the valve plug and the discharge port 21.

From the above description, taken in connection with the accompanying drawing, the construction, manner of operation and several advantages of my invention will be clearly and fully understood. By providing the ports or orifices 17 and 20 in the plug and valve casing respectively and locating the same at the lower sides of the nipples on the valve casing when the valve plug is in its closed position, the water will not collect in the pipes and between the ends of the pipes and the valve casing, but will be completely drained from the pipes and discharged. In practical use, I have found the device highly serviceable, reliable and efficient for the intended purpose.

While I have shown and described the preferred construction and arrangement of the several elements employed, it is to be understood that the invention is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

A combined cut-off and drain cock including a casing having longitudinally elongated inlet and outlet service ports, of a rotary valve member mounted in said casing also having an elongated port to register with the service ports, said casing being further provided with a hot water waste pipe connection, said valve member having a transverse opening through one side thereof communicating with the port of said member adjacent to its lower end and adapted, when said member is in its closed position, to register with the lower end of the outlet service port, the wall of the valve casing also having an orifice opening into the hot water waste port connection adjacent the lower side thereof and communicating with the bore of the valve member when the same is in its closed position, said valve casing having a discharge port also in communication with the bore of the valve casing to register with the lower end of the elongated valve port and receive and discharge the water drained from the service and waste pipes through said valve member.

In testimony whereof I hereunto affix my signature.

CHARLES THOMAS MILLER.